Figure 4:
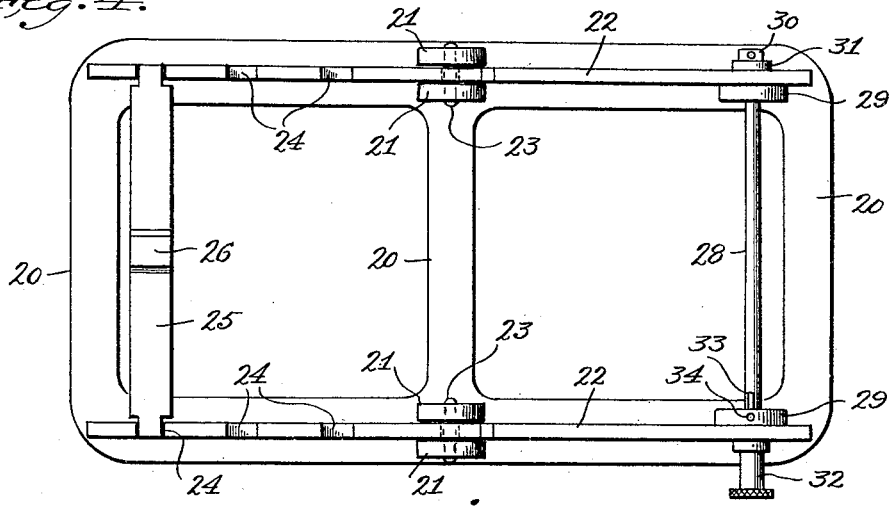

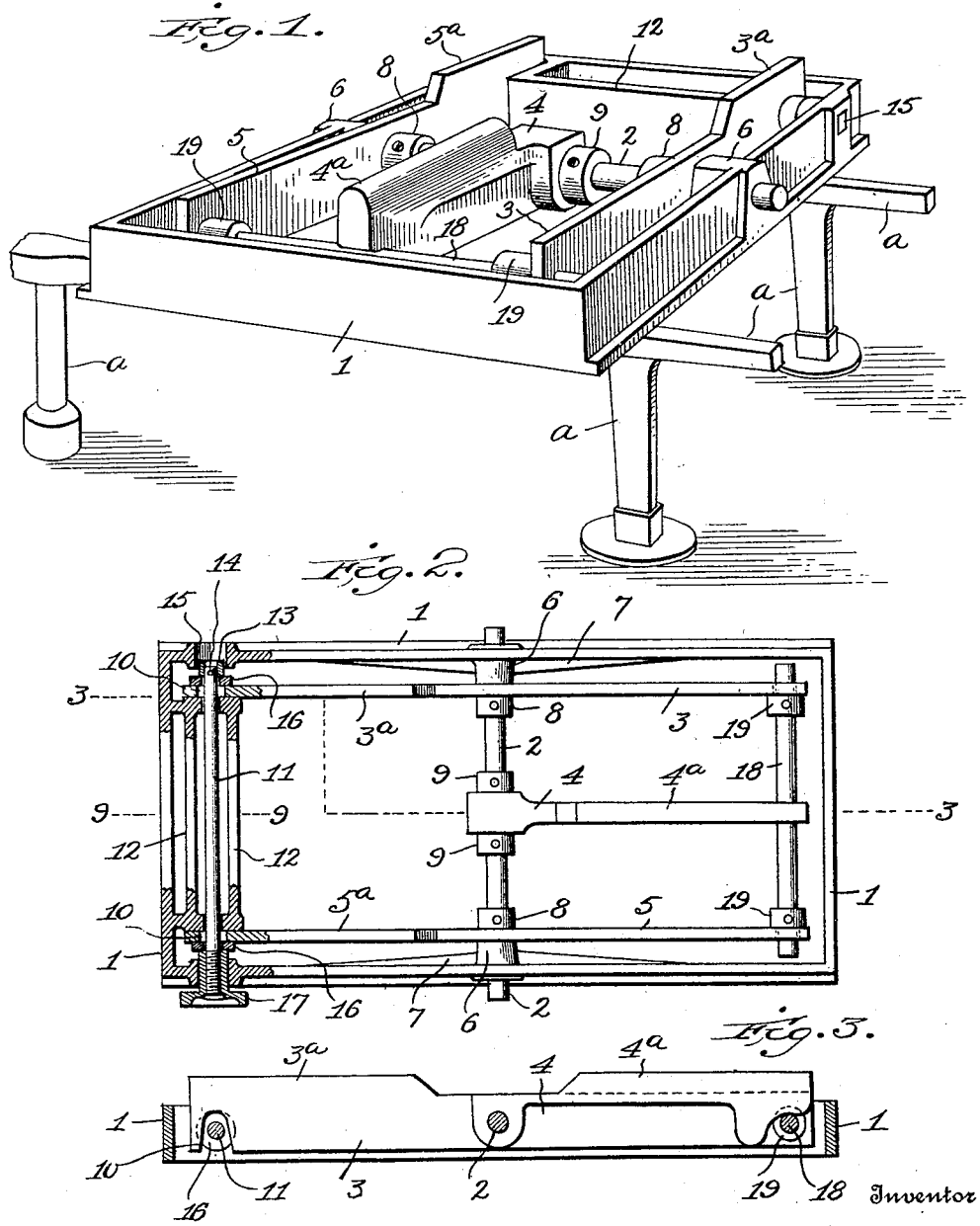

C. O. WOOD.
FLASK REST.
APPLICATION FILED JAN. 5, 1914.

1,117,295.

Patented Nov. 17, 1914.
5 SHEETS—SHEET 2.

Witnesses
B. M. Dommers
E. Leckert.

Inventor
Charles O. Wood

By Henry Orth Jr.
Attorney

THE NORRIS PETERS CO., PHOTO-LITHO., WASHINGTON, D. C.

C. O. WOOD.
FLASK REST.
APPLICATION FILED JAN. 5, 1914.

1,117,295.

Patented Nov. 17, 1914.
5 SHEETS—SHEET 3.

Witnesses
P. Dommers
E. Leckert.

Inventor
Charles O. Wood
By Henry Orth
Attorney

C. O. WOOD.
FLASK REST.
APPLICATION FILED JAN. 5, 1914.

1,117,295.

Patented Nov. 17, 1914.
5 SHEETS—SHEET 4.

Witnesses
B. Sommers
E. Leckert

Inventor
Charles O. Wood
By Henry Orth Jr.
Attorney

C. O. WOOD.
FLASK REST.
APPLICATION FILED JAN. 5, 1914.
1,117,295.
Patented Nov. 17, 1914.
5 SHEETS—SHEET 5.
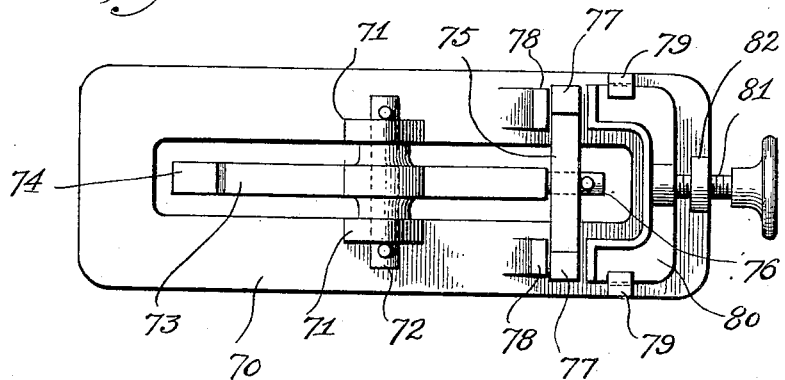
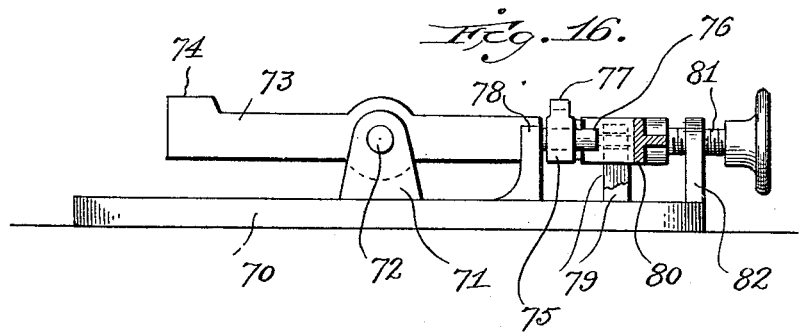
Witnesses
B. Dommers
E. Leckert.
Inventor
Charles O. Wood
By
Attorney

UNITED STATES PATENT OFFICE.

CHARLES O. WOOD, OF CHAMBERSBURG, PENNSYLVANIA.

FLASK-REST.

1,117,295.  Specification of Letters Patent.  Patented Nov. 17, 1914.

Application filed January 5, 1914. Serial No. 810,407.

*To all whom it may concern:*

Be it known that I, CHARLES O. WOOD, a citizen of the United States, residing at Chambersburg, in the county of Franklin and State of Pennsylvania, United States of America, have invented certain new and useful Improvements in Flask-Rests; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to flask rests for molding machines, and has for its object to provide a support or resting mechanism that will automatically adjust itself to unevennesses in the bottom of the flask or in its bottom board, so that no matter whether the pattern support of a molding machine is perfectly level or not, there will be no jar when the pattern is withdrawn from the flask, or the flask from the pattern, as the case may be.

My invention insures that the flask when in position for drawing the pattern, will part from the pattern or pattern plate in a perpendicular line, thus preventing the edges of the mold recess from being broken as the pattern is drawn out. Heretofore this has been done by providing three-point supporting contacts for the bottom of the flask or pattern board, but such devices have been impracticable on account of not having proper automatic adjustability of the contacts, on account of the exceedingly heavy construction, and on account of the use of counterweights for actuating the pair of levers that control the positioning of two of the points of said three point contact, the other point being stationary.

Now according to my invention I use at least a three-point contact, and as many more contact points as are found convenient or necessary in operating with a particular type of molding machine and various sizes and weights of flasks.

I also use at least two levers, on which are provided at least three points of support, but one of the characteristics of these points of support is that they mutually control their movements, so that no matter which point of support is first acted upon by the flask bottom, all the other points of support will immediately automatically adjust themselves with respect to the one first moved, until all the points are in proper contact.

Another important feature is that the automatic adjustment of the points of support is accomplished by the weight of the flask, and a further advantage is that any sized flask may be used that can be placed on the rest, and a still further advantage is that the movements of the points of support are not dependent on the weight of the flask used, and that any weight of flask can be accommodated on the rest within the limits of rupture of the parts, thereby avoiding adjustments for the size and weight of flask.

From a practical standpoint there are many other advantages that have been demonstrated in the actual use of rests embodying my invention.

Figure 5:
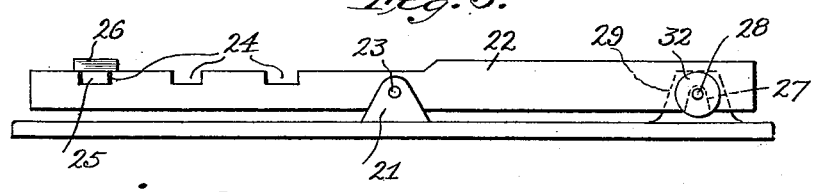
Figure 6:
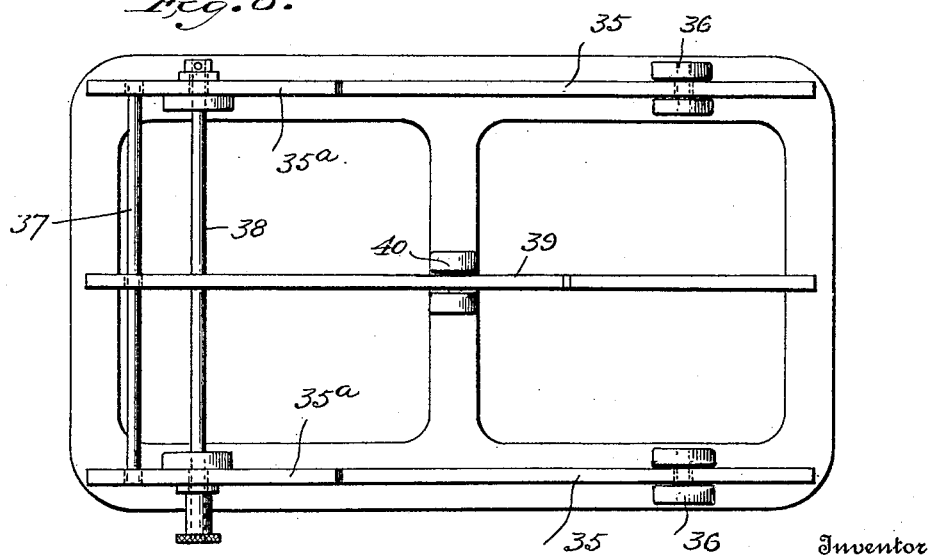
Figure 7:
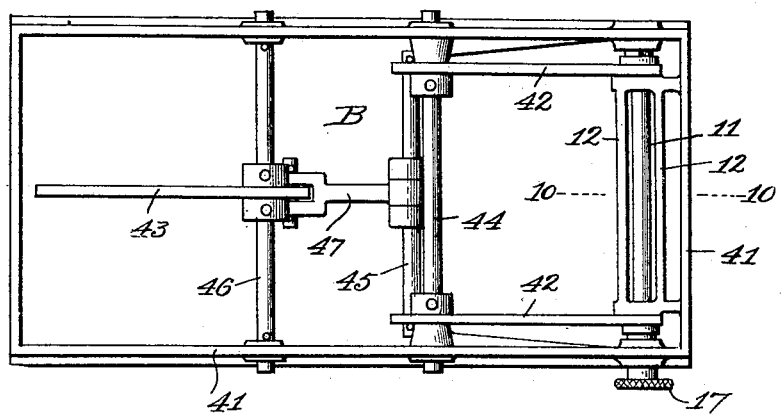
Figure 8:
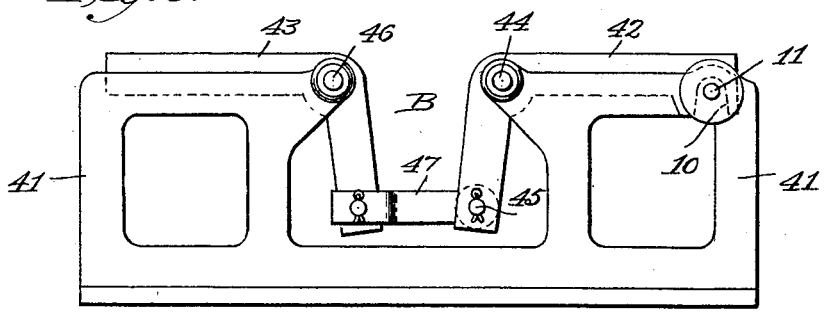
Figure 9:
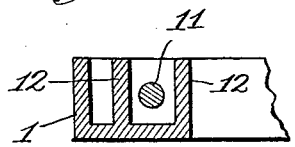
Figure 10:
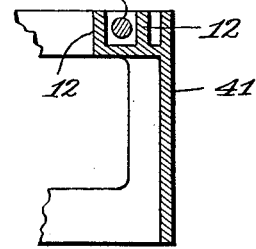
Figure 11:
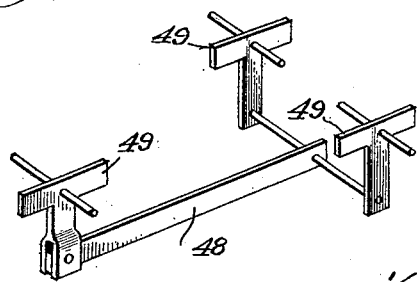
Figure 12:
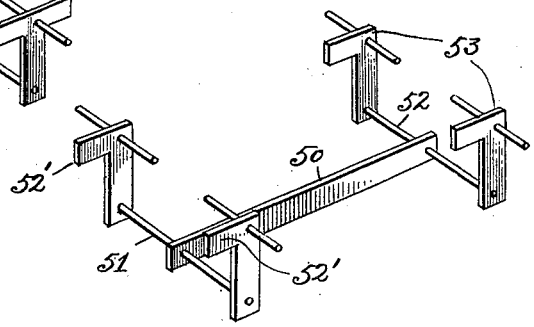
Figure 13:
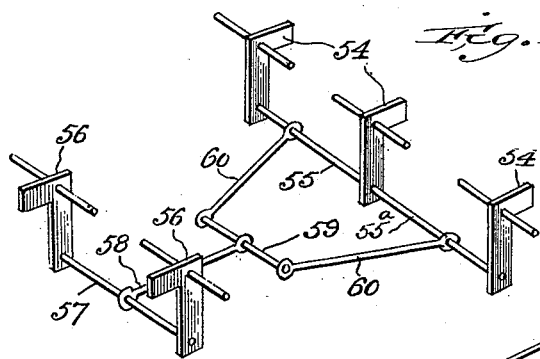
Figure 14:
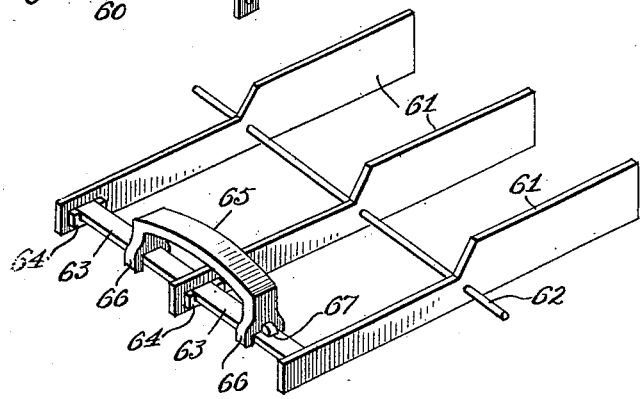

Referring to the accompanying drawings, wherein like parts are similarly designated—Figure 1 is a perspective view of a portion of the frame of a molding machine with a rest embodying my invention. Fig. 2 is a plan view of one form of my invention, partly in section. Fig. 3 is a section on line 3—3, Fig. 2. Fig. 4 is a plan view of a modification of Fig. 2. Fig. 5 is a side elevation of Fig. 4. Fig. 6 shows a slightly different arrangement of the three levers from that shown in Fig. 2. Fig. 7 is a plan view, and Fig. 8 is a side elevation showing a modified form of lever, necessitated by some types of molding machines wherein large clamping means are used. Fig. 9 is a section on line 9—9 of Fig. 2. Fig. 10 is a section on line 10—10 of Fig. 7. Fig. 11 is a perspective view showing a modified arrangement for three point contact. Fig. 12 is a like view showing an arrangement for four point contact. Fig. 13 is a like view showing an arrangement for five point contact. Fig. 14 is a like view showing six levers arranged for four point contact. Figs. 15 and 16 are plan view and side elevation, respectively, of a two lever structure arranged for three point contact.

Referring now to Figs. 1 to 3 and Fig. 9, wherein I have shown a three lever three point rest, the perspective view, Fig. 1, shows the rest supported on the frame of a molding machine indicated by *a*. This rest comprises a frame 1, preferably but not necessarily of cast iron. Passing through the frame and journaled therein is a shaft 2, and on this shaft are journaled three levers, 3, 4 and 5. The sides of the frame are provided with shaft bearings 6 projecting toward the inside of the frame a sufficient distance to properly space the adjacent lever 3 or 5 from the sides of the frame. For greater strength I provide reinforcing webs 7 between the bearings 6 and the sides of the frame to which they are connected or form an integral part. Collars 8 on the shaft 2 hold the levers 3 and 5 in proper position, while two collars 9 one on each side of lever 4 hold said lever in the position allotted to it on shaft 2.

The levers may have any suitable configuration commensurate with the idea of three point contact, but I have found the shapes of these levers as indicated in Fig. 3 quite suitable for the purpose. The outer levers 3 and 5 are alike and extend toward the ends of the frame, and both have raised or elevated supporting portions 3ª and 5ª respectively, and are provided with hooks, slots, or recesses 10 at their lower edges so that these levers will be free to swing on shaft 2 and with respect to a rod 11. This rod 11 is mounted in supports 12, Figs. 1, 2 and 9, forming part of the frame 1. The rod has at one end a head 13, which in this instance is a square nut prevented from rotating on the end of rod 11 by a pin 14. The head fits into a square opening 15 in the frame and the rod and nut cannot be turned. Collars 16 are placed loose on the rod 11, and a hand wheel 17 on the other threaded end of the rod 11 has bearing in one of the sides of the frame. By turning hand wheel 17 the rod is drawn so that the washers 16 clamp the levers 3 and 5 against the supports 12, to prevent movement of the flask after it has been placed on the rest. It is, of course, understood that any other form of locking mechanism may be used to hold the levers in their adjusted position.

In the tails of the outer levers 3 and 5 loosely rests a rod 18, prevented from slipping out by washers 19, so that one of these levers is free to move without moving the other. The middle lever 4 also has a head 4ª, and its free end simply rests on rod 18.

The operation is quite simple, all the levers being free to move, the flask is let down on the rest, and it is immaterial which lever head, 3ª, 4ª or 5ª it first loads, the other two will automatically come into proper bearing position solely by reason of the load.

In Fig. 4 I have shown a modification to produce a lighter and simpler structure for small flasks, or flasks of light weight when carrying the mold. Here I have shown a frame 20, having ears 21 between pairs of which the outer like levers 22 are mounted on pivots 23. The tails of these levers are provided with notches 24 in which loosely rest the ends of a supporting member 25 having a raised supporting head 26 at or about its middle. This member is adjustable to or from the pivots 23 to accommodate various sizes of flasks instead of relying upon the lengths of the heads of the levers, as in Figs. 1 and 2. It should be noted that the member 25 in effect combines the function of rod 18 and lever 4, in Figs. 1 and 2. The locking mechanism in Fig. 4 is similar in operation to that described with reference to Figs. 1 and 2. The levers 22 are provided with slots 27 through which passes rod 28 held in two lugs 29. One end of the rod has a head 30 and washer 31, between which and one of the lugs 29 one lever is held while the other lever is held between the other lug 29 and the hand screw 32 when the screw is rotated to draw the rod 28. Ordinarily this locking mechanism will answer all practical purposes, but if the rod 28 should turn when operating the hand wheel 32, said rod 28 may be provided with a slot 33 through which passes a pin 34, as shown in Fig. 4.

In Fig. 6 I have shown a further modification, wherein the pivots for the three levers are not in alinement. The outer levers 35 are pivoted somewhat farther back from their heads 35ª as at 36, than in the other figures, and the loose cross rod 37 passes through the same end of the outer levers as the locking rod 38. The middle lever 39 is substantially as long as the outer levers and is pivoted near its middle at 40, while its tail rests on rod 37 or rod 37 passes loosely through it as indicated at 10, 11, in Fig. 3. Of course the tail of lever 39 clears the locking rod 38 under all conditions of operation.

In some molding machines there is a clamping member to clamp the flask to the pattern plate or pattern head that occupies considerable space, and in such cases a straight lever cannot be used, as space must be left near the middle of the rest to accommodate this clamp. In order to do this I use a deeper frame 41, Figs. 7 and 8, and use bent levers, or what is termed bell-crank levers 42, 43, the levers 42 being at one end of the frame and mounted on shaft 44 as a pivot, their depending arms carrying a loose connecting rod 45. The third lever 43 is mounted on shaft 46, and its depending arm is connected to rod 45 by a link 47. The link 47 may be made in one piece with rod 45 or it may be rigidly connected thereto so that 47 and 45 will operate and have the effect of a single rod. The well or recess B for the reception of the molding machine clamp is formed between the two shafts 44 and 46. The means for locking the bell-crank levers 42 after the seating of the flask thereon is the same as that described with reference to Figs. 1–3, and the frame is similarly formed, as will be seen from the section taken on line 10—10 and illustrated in Fig. 10. The link 47 may be short, as shown in Figs. 7 and 8, or long, as diagrammatically shown at 48 in Fig. 11, and these levers may be bell-crank levers, either L-shaped, (single bell-crank) or T-shaped, (double bell-crank) as indicated at 49, Fig. 11.

I have previously stated that three point contact may be used, and if practicable the three lever arrangement is preferred, yet there are many instances where more than three points of contact are either desirable or necessary. In Fig. 12 I have shown, diagrammatically, a four point contact, there being a link 50 extending between rods 51 and 52 of opposite pairs of L-shaped or T-shaped levers 52' and 53.

In Fig. 13, I have diagrammatically illustrated a five point contact, three of the levers 54 being connected to two rods 55, 55ª, and two levers 56, to a rod 57. The rod 57 is connected by a link 58 to an equalizing bar 59, whose ends are connected by two links 60 to the rods 55 and 55ª at points between the levers 54, as indicated.

In Fig. 14, while I have illustrated but a four point contact, I illustrate the use of six levers, there being three parallel levers 61 mounted on a shaft 62, common to all of them. There are two transverse bars or levers 63, loosely supported between the tails of levers 61, so that each of the bars 63 will be free to move independently. The bars or levers 63 rest in open top lateral sockets 64 cast on the tails of levers 61, or otherwise formed, the specific form of connection or support being immaterial. Resting on these levers 63 is a yoke or sixth lever 65 whose feet 66 are yoke-shaped to embrace the levers 63 and prevent them from slipping off of levers 63. The longitudinal displacement of the lever 65 is prevented by lugs, bolts, pins or the like 67. The member 65 is yoke-shaped to permit a limited extent of free movement of the middle lever 61.

In Figs. 12 and 13 the levers on either end of the frame may be locked, but in Fig. 14 the locking mechanism should be applied to the levers 61.

In Figs. 15 and 16, I have shown a base 70 having lugs 71 through which passes a pivot pin 72 carrying a lever 73 having a contact point 74 on one side of the pivot 72. On the other side of the pivot point is a lever 75 loosely mounted on lever 73, preferably mounted on a pivot pin 76 and having two contact points 77. The ends of the lever 75 move with respect to two stationary abutments or lugs 78 on the frame 70. The frame also has two grooved lugs 79 in which is mounted a yoke shaped compression member 80, whose arms are arranged opposite lugs 78. This member has a central screw 81 mounted in the frame post 82. The lever 75 is free to move on its pivot 76 while lever 73, by reason of the loose connection between 76 and 77 is free to rock on its pivot 72. By operating the screw 81 the lever 75 is clamped between the ends of yoke 80 and the abutments 78 and in turn holds lever 73.

Many other structures may be devised without departing from my invention, it simply being essential that, whatever the combination of levers used to obtain at least three points of support, the adjustment of any one point will automatically influence all of the others to accommodate themselves to the surface to be supported.

I claim—

1. In a flask rest, a plurality of levers arranged to give at least three movable points of contact, the seating of any one of which in advance of the others controls the adjustment of the other points and causes said other points to automatically come into seating position under all conditions of operation.

2. In a flask rest, a plurality of levers arranged to give at least three movable points of contact, the seating of any one of which in advance of the others controls the adjustment of the other points and causes said other points to automatically come into seating position, and means for locking the levers in their adjusted position.

3. A flask rest comprising a frame, at least three levers pivotally mounted in said frame, there being a greater number of levers arranged for seating contact at one end of said frame than at the other end, connections between the levers, the seating of any one lever in advance of the seating of any or all of the others causing an automatic seating of all the other levers.

4. A flask rest, comprising a frame, at least three levers pivotally mounted in said frame, there being a greater number of levers arranged for seating contact at one end of said frame than at the other end, connections between the levers, the seating of any one lever in advance of the seating of any or all of the others causing automatic seating of all the other levers, and means for locking the levers in their adjusted position.

5. A flask rest comprising a frame, a shaft, mounted therein, three parallel levers pivotally mounted on the shaft, a rod loosely supported in the tails of the two outer levers, the third lever arranged to be operated by said rod, and means to lock two levers after their adjustment.

6. A flask rest comprising a frame, at least three levers pivotally mounted in the frame and arranged in unequal numbers for seating contact at opposite ends of the frame, and connections between the levers arranged to automatically and mutually cause their seating when the weight of the flask is placed on said levers.

7. A flask rest, comprising a frame, three lever elements, means loosely connecting a pair of said elements and said means controlling the third element, and means to hold the levers in any of their adjusted positions.

8. A flask rest, comprising a frame, three parallel levers pivoted in the frame, a rod loosely supported in the ends of two of the levers and contacting with the third lever, and means for locking the levers in their adjusted position.

9. A flask rest, comprising a frame, a shaft, three parallel levers pivotally mounted on the shaft, a rod loosely supported in the tails of the two outer levers, the third lever resting on said rod, and means to lock two levers after adjustment.

10. A flask rest, comprising a frame, a shaft, a pair of parallel levers pivotally mounted on the shaft, a rod loosely supported in the ends of said levers, a locking rod, means on the frame in which the locking rod is supported, means on the locking rod for clamping the ends of said levers against said supporting means, and a third lever having one end mounted on the shaft and the other end resting on the loose rod.

11. A flask rest, comprising a frame, a shaft, a pair of levers pivoted at about their middle on the shaft and having slotted ends, a rod loosely supported in the opposite ends of the levers, a locking rod having a head and a threaded end, means on the frame in which the locking rod is supported, means to prevent the rod from rotating, a hand nut on said threaded end, said rod passing through the slots in the levers, whereby the levers are clamped by the head and nut against the support, and a third lever pivoted on the shaft and resting on the loose rod.

12. In a flask rest, a plurality of levers arranged to give at least three points of contact, each lever having a movement constrained only by one or more of the other levers, the seating of any one point of contact controlling the movement of all the levers to cause all of said other points of contact to automatically come into seating position.

13. In a flask rest, a frame, a plurality of levers pivotally mounted therein, having limited movements and arranged to give at least three points of contact, said levers having unconstrained movements within their limits of motion.

In testimony that I claim the foregoing as my invention, I have signed my name in presence of two subscribing witnesses.

CHARLES O. WOOD.

Witnesses:
W. T. BRONSON,
CHAS. J. ZULLINGER.